(12) United States Patent
Shinohara et al.

(10) Patent No.: US 11,486,559 B2
(45) Date of Patent: Nov. 1, 2022

(54) LIGHT EMITTING DEVICE

(71) Applicant: OMRON Corporation, Kyoto (JP)

(72) Inventors: Masayuki Shinohara, Nagaokakyo (JP); Norikazu Kitamura, Osaka (JP); Yoshihiko Takagi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/284,788

(22) PCT Filed: Sep. 17, 2019

(86) PCT No.: PCT/JP2019/036288
§ 371 (c)(1),
(2) Date: Apr. 13, 2021

(87) PCT Pub. No.: WO2020/090258
PCT Pub. Date: May 7, 2020

(65) Prior Publication Data
US 2021/0404625 A1 Dec. 30, 2021

(30) Foreign Application Priority Data
Oct. 31, 2018 (JP) .............................. JP2018-206136

(51) Int. Cl.
*F21S 43/243* (2018.01)
*F21S 43/249* (2018.01)
(Continued)

(52) U.S. Cl.
CPC ............. *F21S 43/243* (2018.01); *F21S 43/14* (2018.01); *F21S 43/239* (2018.01); *F21S 43/249* (2018.01); *F21V 3/0615* (2018.02)

(58) Field of Classification Search
CPC ........ F21S 43/243; F21S 43/249; F21S 43/14; F21S 43/239; F21V 3/0615
See application file for complete search history.

(56) References Cited

U.S. PATENT DOCUMENTS

| 5,711,592 A | 1/1998 | Hotta | |
| 2008/0186726 A1* | 8/2008 | Okada | B60Q 1/0041 362/509 |

(Continued)

FOREIGN PATENT DOCUMENTS

| CN | 102939498 A | 2/2013 |
| CN | 107208867 A | 9/2017 |

(Continued)

OTHER PUBLICATIONS

The International Search Report of International Application No. PCT/JP2019/036288 dated Oct. 21, 2019.
(Continued)

*Primary Examiner* — Bryon T Gyllstrom
*Assistant Examiner* — Christopher E Dunay
(74) *Attorney, Agent, or Firm* — Shinjyu Global IP

(57) ABSTRACT

A light emitting device is provided to a vehicle. The light emitting device includes a display portion and a light emitting portion. The display portion includes a first light source and a light guide plate that guides light from the first light source to form a first image in a space. The light emitting portion includes a second light source and a light emitting region that overlaps with the first image in a vehicle front-rear direction at a position close to the first image and emits light from the second light source to the outside of the vehicle.

12 Claims, 11 Drawing Sheets

(51) Int. Cl.
  *F21S 43/14*  (2018.01)
  *F21S 43/239* (2018.01)
  *F21V 3/06*   (2018.01)

(56) References Cited

U.S. PATENT DOCUMENTS

| | | | |
|---|---|---|---|
| 2012/0274462 A1 | 11/2012 | Martinez et al. | |
| 2012/0306861 A1* | 12/2012 | Minami | G02B 30/30 345/419 |
| 2013/0010487 A1 | 1/2013 | Buisson | |
| 2015/0331169 A1 | 11/2015 | Jang et al. | |
| 2017/0282785 A1* | 10/2017 | Albou | F21S 41/675 |
| 2018/0022269 A1* | 1/2018 | Mugge | B60Q 1/2696 362/509 |
| 2018/0156411 A1* | 6/2018 | Cornelissen | F21S 41/153 |
| 2019/0072708 A1* | 3/2019 | Liu | B60Q 1/2611 |
| 2019/0137772 A1 | 5/2019 | Takagi et al. | |
| 2019/0162383 A1* | 5/2019 | Kim | G02B 6/0036 |
| 2020/0240610 A1* | 7/2020 | Thomae | F21S 43/14 |

FOREIGN PATENT DOCUMENTS

| | | |
|---|---|---|
| JP | 2003-123513 A | 4/2003 |
| JP | 2007-221359 A | 8/2007 |
| JP | 2012-252249 A | 12/2012 |
| JP | 2014-82041 A | 5/2014 |
| JP | 2017-92011 A | 5/2017 |
| JP | 2018-13553 A | 1/2018 |

OTHER PUBLICATIONS

The Written Opinion of the International Searching Authority of International Application No. PCT/JP2019/036288 dated Oct. 21, 2019.

The Office Action for the corresponding Chinese application No. 201980066287.9, dated Jul. 4, 2022.

* cited by examiner

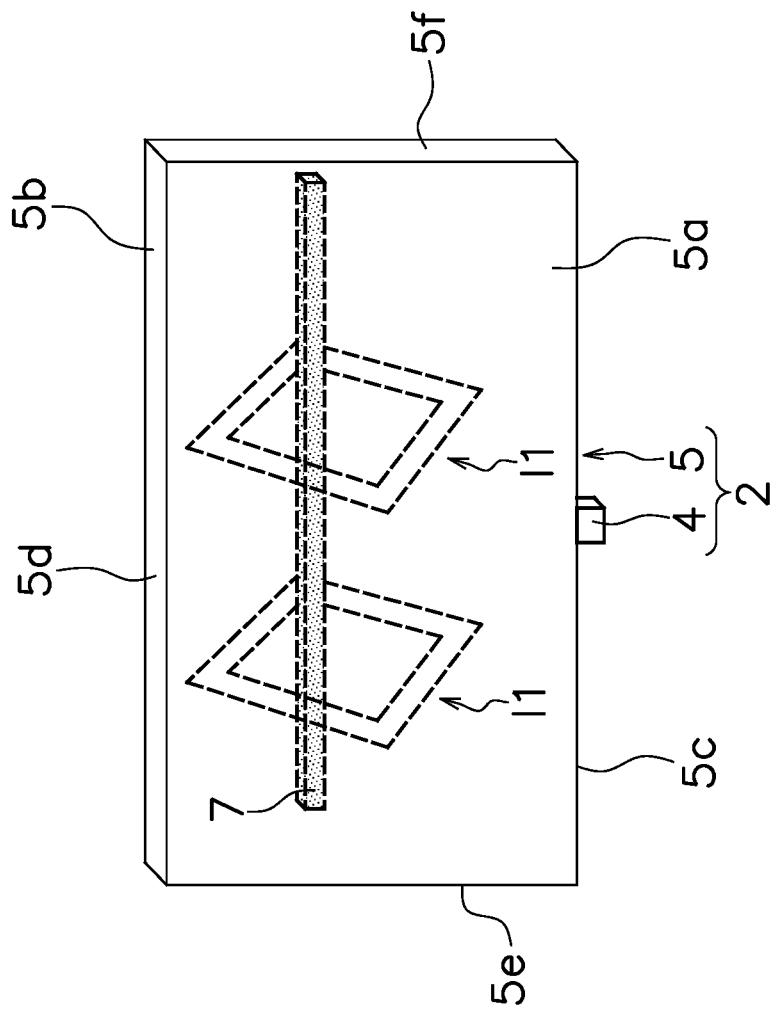
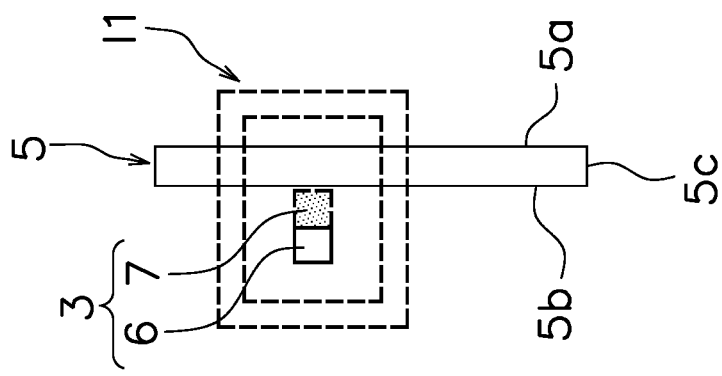
FIG. 7A
FIG. 7B

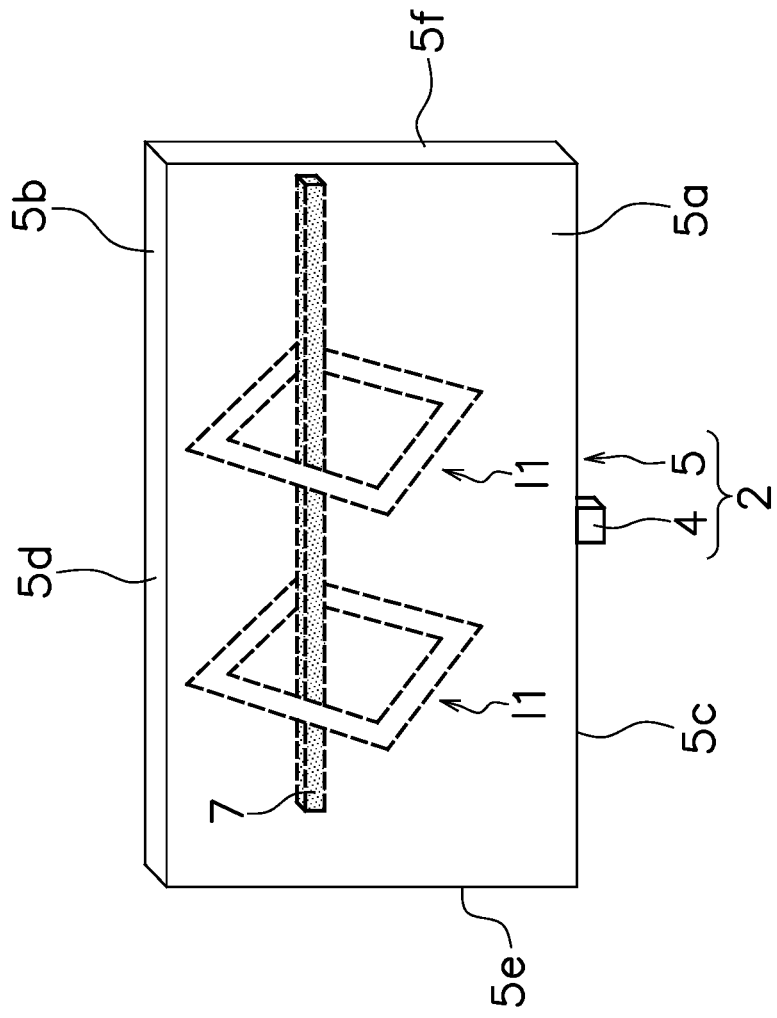
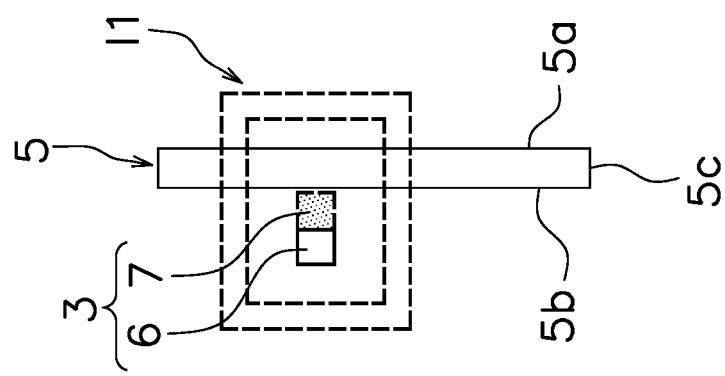
FIG. 8B
FIG. 8A

LIGHT EMITTING DEVICE

CROSS-REFERENCE TO RELATED APPLICATION

This application is the U.S. National Phase of International Application No. PCT/JP2019/036288, filed on Sep. 17, 2019. This application claims priority to Japanese Patent Application No. 2018-206136, filed Oct. 31, 2018. The contents of those applications are incorporated by reference herein in their entireties.

FIELD

The present invention relates to a light emitting device provided to a vehicle.

BACKGROUND

Conventionally, a light emitting device capable of producing light with a three-dimensional effect is known (see Japanese Laid-Open Patent Publication No. 2014-082041). The light emitting device functions as, for example, a tail light of a vehicle.

SUMMARY

In Japanese Laid-Open Patent Publication No. 2014-082041, the light with a three-dimensional effect is produced by using a plurality of light guide plates, whereby the cost of the light emitting device may increase. Moreover, when the design of light is complicated, the cost of the light emitting device may further increase.

An object of the present invention is to provide a light emitting device capable of expressing a three-dimensional and complicated design while suppressing a manufacturing cost.

A light emitting device according to one aspect of the present invention is a light emitting device provided to a vehicle. The light emitting device includes a display portion and a light emitting portion. The display portion includes a first light source and a light guide plate that guides light from the first light source to form a first image in a space. The light emitting portion includes a second light source and a light emitting region that overlaps with the first image in a vehicle front-rear direction at a position close to the first image and emits light from the second light source to an outside of the vehicle.

In the light emitting device according to the present aspect, the light emitting region overlaps with the first image in the vehicle front-rear direction at a position close to the first image. As a result, the light emitting region serves as a reference surface with respect to the first image, thereby improving a three-dimensional effect of the first image. Further, the light emitting device is configured to form an image in a space by the light guide plate. Therefore, it is possible to express a three-dimensional and complicated design while suppressing a manufacturing cost of the light emitting device.

The light guide plate does not have to form an image of a portion of the first image that overlaps with the light emitting region at a front side of the light emitting region in the vehicle when viewed from the rear of the vehicle. In this case, a three-dimensional effect of the first image is further improved.

The light emitting region does not have to emit light from the second light source to the outside of the vehicle in a region that the light emitting region overlaps with the first image at a rear side of the first image in the vehicle when viewed from the rear of the vehicle. Even in this case, a three-dimensional effect of the first image is further improved.

The light emitting device may further include a cover that is translucent and covers the light emitting region from the outside of the vehicle. A rear end of the first image may be positioned on a rear surface of the cover. In this case, the cover serves as a reference surface with respect to the first image, thereby improving a three-dimensional effect of the first image.

The light emitting device may further include a cover that is translucent and covers the light emitting region from the outside of the vehicle. The cover may include a second image displayed at a position that overlaps with the first image in the vehicle front-rear direction. In this case, the second image serves as a reference surface with respect to the first image, thereby improving a three-dimensional effect of the first image.

The light guide plate may include a curved portion. The radial dimension of the curved portion may be 180 mm or more. In this case, distortion of an image is less likely to be recognized when the image is seen.

The light guide plate may include a light emitting surface that emits light from the first light source. A test pattern portion for evaluating an emission characteristic of the light guide plate may be provided on a part of the light emitting surface. In this case, it is possible to easily evaluate the emission characteristic of the light guide plate.

BRIEF DESCRIPTION OF THE DRAWINGS

FIGS. 7A and 7B are views schematically illustrating a side view and a perspective view of the light emitting device according to a first modification.

FIGS. 8A and 8B are views schematically illustrating a side view and a perspective view of the light emitting device according to a second modification.

DETAILED DESCRIPTION

Figure 1:
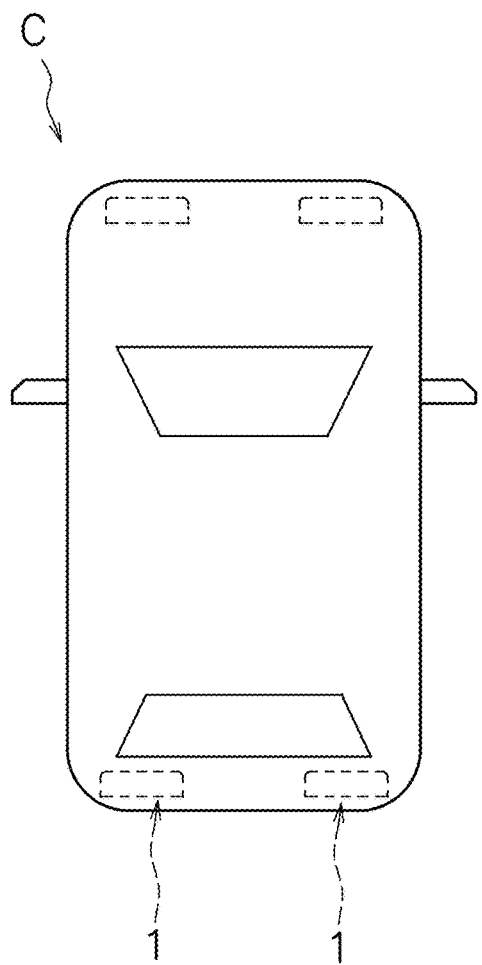
FIG. 1 is a schematic view of a vehicle when viewed from above.

Hereinafter, a light emitting device 1 according to an embodiment will be described with reference to the drawings. FIG. 1 is a schematic view of a vehicle C when viewed from above. The light emitting device 1 is provided to the vehicle C. The vehicle C in this embodiment is an automobile. The light emitting device 1 functions as a tail light provided at rear right and left sides of the vehicle C. The vehicle C is not limited to an automobile and may be a motorcycle, a train, or the like.

Figure 2B:
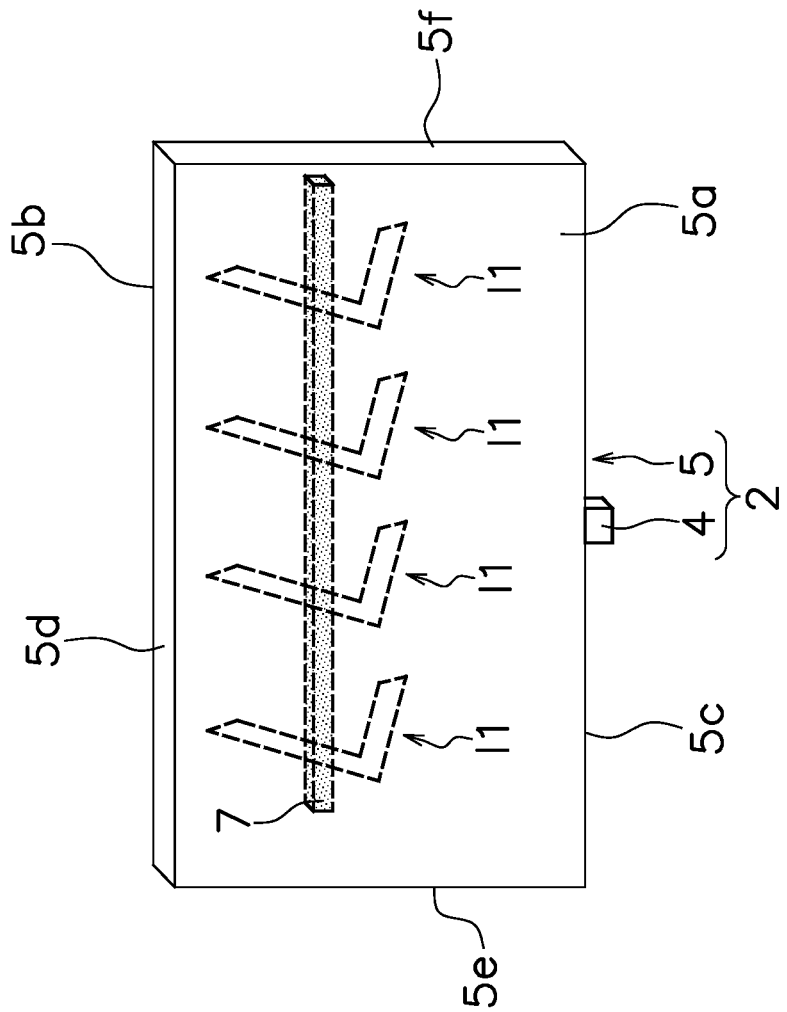
FIGS. 2A and 2B are views schematically illustrating a side view and a perspective view of a light emitting device.
Figure 2A:
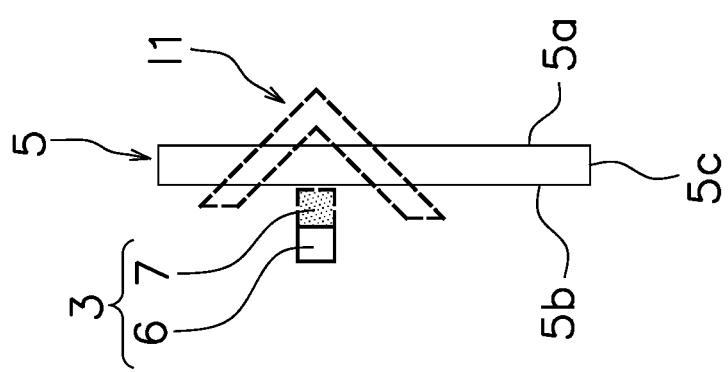

FIG. 2A is a schematic side view of the light emitting device 1. FIG. 2B is a schematic perspective view of the light emitting device 1. The light emitting device 1 includes a display portion 2 and a light emitting portion 3.

The display portion 2 includes a first light source 4 and a light guide plate 5. The first light source 4 is, for example, a light emitting diode (LED). The first light source 4 is not limited to an LED and may be another light source such as an organic light emitting diode (OLED) or a laser diode (LD).

The light guide plate 5 guides light from the first light source 4 to form an image I1 in a space. Accordingly, the light guide plate 5 projects the image I1 perceived from the outside of the vehicle C in a space without a screen. The image I1 is an example of a first image. The light guide plate 5 is made from a translucent material. The light guide plate 5 is made from, for example, a transparent resin such as polymethylmethacrylate (PMMA), polycarbonate, or a cycloolefin polymer, or a material such as glass.

The light guide plate 5 includes a light emitting surface 5a, a rear surface 5b, and end surfaces 5c to 5f. The light emitting surface 5a emits light from the first light source 4. The rear surface 5b is positioned opposite to the light emitting surface 5a. Light from the first light source 4 is incident on the end surface 5c. The light from the first light source 4 may be incident on the other end surfaces 5c to 5f. Also, the light from the first light source 4 may be emitted from the rear surface 5b.

In a case where the light guide plate 5 is fixed to a housing (not illustrated), it is preferable that only one of the opposite sides is fixed to the housing. Here, the opposite sides are the end surface 5e and the end surface 5f. Only one of the opposite sides is fixed to the housing, thereby reducing damage to the light guide plate 5 caused by thermal expansion or contraction. The light guide plate 5 is fixed to the housing by fixing means such as screw coupling, snap fit, or sandwiching.

The light guide plate 5 includes a plurality of light guide portions. The plurality of light guide portions are provided corresponding to a plurality of fixed points included in the image I1. Each light guide portion includes a plurality of prisms (not illustrated). The plurality of prisms are arranged so as to reflect light from the first light source 4 toward the light emitting surface 5a of the light guide plate 5 and allow the light to converge at the fixed points corresponding to the light guide portions. As a result, a wave surface of light that appears to be emitted from the plurality of fixed points is formed, and the image I1 is formed in a space with a group of light converged at the plurality of fixed points.

As illustrated in FIGS. 2A and 2B, the image I1 projects from the light guide plate 5 in the vehicle front-rear direction. Further, the image I1 is formed such that a plurality of substantially L-shaped three-dimensional images are arranged in the vehicle width direction. The image I1 may be formed so as to project forward or backward of the light guide plate 5 in the vehicle C.

In the present embodiment, the light emitting portion 3 is a tail light and includes a second light source 6 and a light emitting region 7. The second light source 6 may be, for example, an LED similar to the first light source 4 or a light bulb. The second light source 6 emits red light, for example. The light emitting region 7 is, for example, a light emitting portion of a light guide plate or a light guide lens (not illustrated) and emits light from the second light source 6 to the outside of the vehicle C. The light guide plate or the light guide lens may be omitted. In that case, the light emitting portion of the second light source 6 coincides with the light emitting region 7.

As illustrated in FIGS. 2A and 2B, the light emitting region 7 overlaps with the image I1 in the vehicle front-rear direction at a position close to the image I1. The light emitting region 7 in the present embodiment extends linearly in the vehicle width direction when viewed from the rear of the vehicle. The shape of the light emitting region 7 is not limited. It only needs to be configured that at least a part of the light emitting region 7 overlaps with the image I1 in the vehicle front-rear direction.

With the light emitting device 1 according to the above configuration, the light emitting region 7 overlaps with the image I1 in the front-rear direction of the vehicle C at a position close to the image I1. As a result, the light emitting region 7 serves as a reference surface with respect to the image I1, thereby increasing a sense of depth of the image I1 and improving a three-dimensional effect of the image I1. Further, the light emitting device 1 is configured to form the image I1 in a space by the light guide plate 5. This enables expressing a three-dimensional and complicated design at the tail light of the vehicle C while suppressing the manufacturing cost of the light emitting device 1.

Although an embodiment of the present invention has been described so far, the present invention is not limited to the above embodiment and various modifications may be made within the scope of the invention.

The means of forming the image I1 at the display portion 2 may be achieved by another known means of image forming. Alternatively, the image forming may be achieved in a binocular or multi-view manner.

Figure 3:
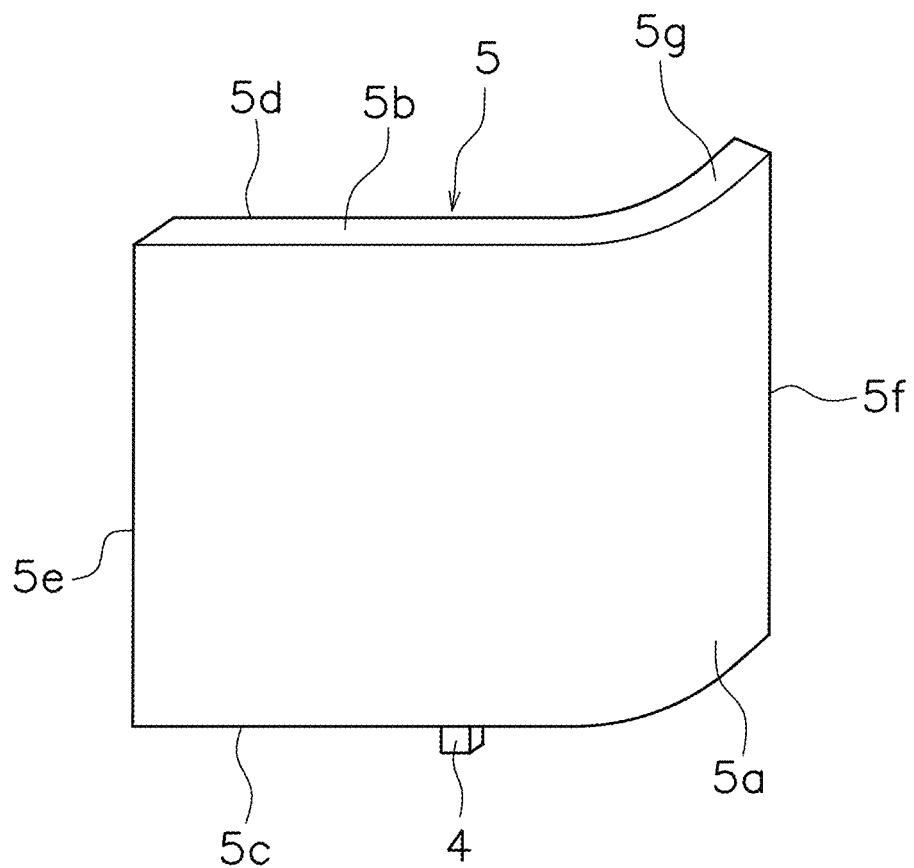
FIG. 3 is a perspective view of a light guide plate.

In the above embodiment, the light guide plate 5 has a substantially rectangular shape, but the light guide plate 5 may include a curved portion 5g as illustrated in FIG. 3. In a case where the light guide plate 5 includes the curved portion 5g, it is preferable to set a radial dimension of the curved portion 5g to 180 mm or more in order to reduce distortion of the image I1. By setting the radial dimension of the curved portion 5g to 180 mm or more, the distortion of the image I1 is less likely to be recognized when the image I1 is seen. The light guide plate 5 may be entirely curved.

Figure 4C:
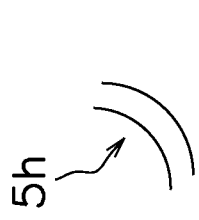
FIGS. 4A, 4B, 4C, 4D, and 4E are views illustrating a side view of a light guide plate.
Figure 4D:
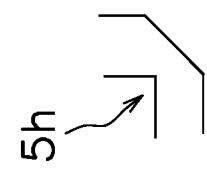
Figure 4E:
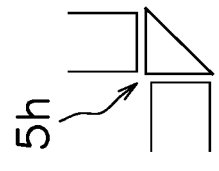
Figure 4B:
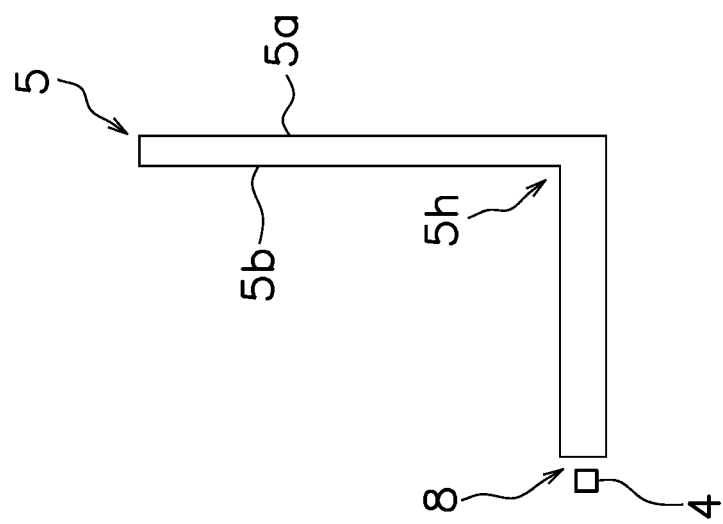
Figure 4A:
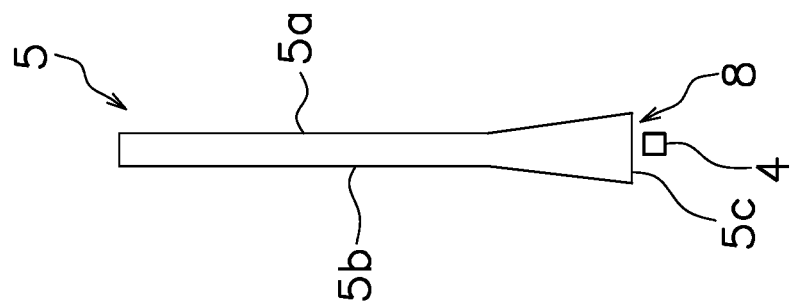

As illustrated in FIG. 4A, a light receiving portion 8 includes the end surface 5c on which light from the first light source 4 is incident. The light receiving portion 8 may have a tapered shape that expands toward the first light source 4. In this case, it is possible to prevent a reduction in the amount of light due to a position shift of the first light source 4. Further, as illustrated in FIG. 4B, the light receiving portion 8 may include a bent portion 5h that is bent with respect to the light emitting surface 5a and the rear surface 5b. Even in this case, the diameter of the light receiving portion 8 may be increased to prevent a decrease in the amount of light due to a position shift of the first light source 4. As illustrated in FIGS. 4C to 4E, an R-shaped or flat-shaped (integral or separate) reflecting portion is disposed at the bent portion 5h.

Figure 5A:
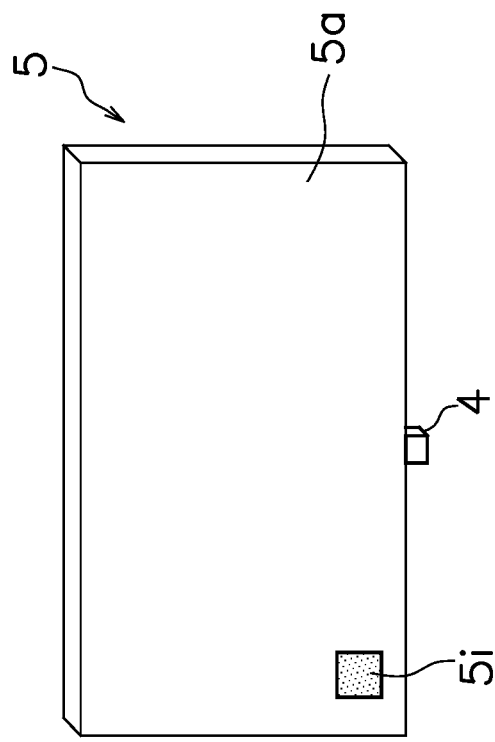
FIGS. 5A, 5B, 5C, 5D, and 5E are views illustrating examples of a test pattern.
Figure 5E:
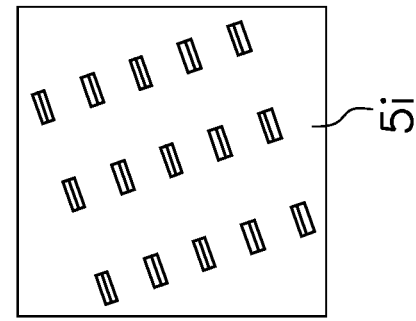
Figure 5D:
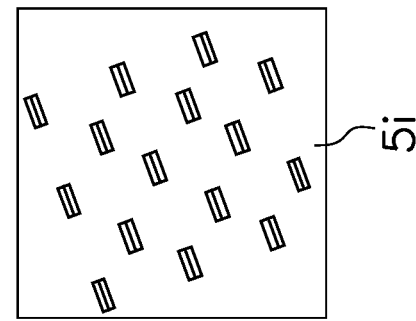
Figure 5C:
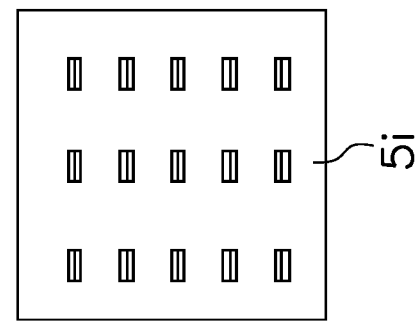
Figure 5B:
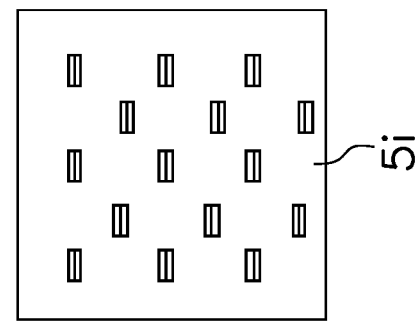

As illustrated in FIG. 5A, the light guide plate 5 may further include a test pattern portion 5i. The test pattern portion 5i is disposed on a part of the light emitting surface 5a. The test pattern portion 5i is provided in order to easily evaluate an emission characteristic of the light guide plate 5. As illustrated in FIGS. 5B to 5E, the test pattern portion 5i is provided with a regular pattern in a staggered arrangement, a grid arrangement, or an arrangement inclined with respect to a light guide direction. The emission characteristic of the light guide plate 5 can be easily evaluated by using the test pattern portion 5i. The test pattern portion 5i is preferably disposed at a position invisible from the outside of the vehicle C.

In the above embodiment, the light emitting device 1 is applied to a tail light, but it may be applied to a headlight, for example. Further, a region where a brake light, a turn signal, or the like emits light may be the light emitting region 7. That is, it may be configured such that the image I1 overlaps with a brake light or a turn signal. Further, the image I1 may be overlapped with a reflector of a tail light. Further, the display portion 2 and the light emitting portion 3 in the light emitting device 1 may be configured in combination with a tail light, a brake light, a turn signal, or a backup light. For example, in the light emitting device 1, the display portion 2 may be a tail light and the light emitting portion 3 may be a brake light.

Figure 6:
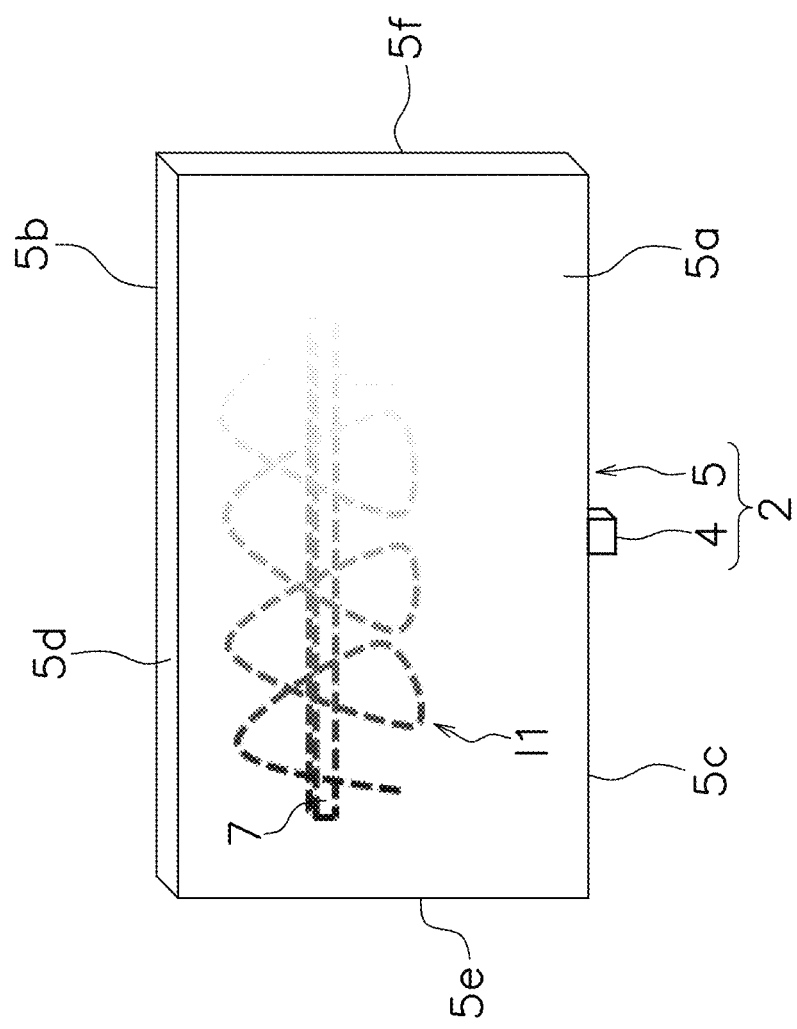
FIG. 6 is a view illustrating an example of an image.

The shape of the image I1 is not limited to the above embodiment. For example, as illustrated in FIG. 6, the image I1 may be a three-dimensional image that extends spirally around the light emitting region 7. Further, as illustrated in FIG. 6, the image I1 may be formed in gradation by gradually decreasing the pattern size or the pattern density.

FIG. 7A is a schematic side view of the light emitting device 1 according to a first modification. FIG. 7B is a schematic perspective view of the light emitting device 1 according to the first modification. The light guide plate 5 in the first modification is configured so as not to form an image of a portion of the image I1 that overlaps with the light emitting region 7 at a front side of the light emitting region 7 in the vehicle C when viewed from the rear of the vehicle C. Further, the image I1 in the first modification has a hollow square shape, and a part of the light emitting region 7 is disposed in the hollow portion. In this case, when the light emitting device 1 is viewed from the rear of the vehicle C, a portion of the image I1 that overlaps with the light emitting region 7 at a front side (left side of FIG. 7A) of the light emitting region 7 is not displayed. This enables to improve a three-dimensional effect of the image I1. In particular, in a case where the light emitting device 1 is applied to a brake light or a turn signal, the three-dimensional effect of the image I1 is further improved when the brake light or the turn signal is lit.

FIG. 8A is a schematic side view of the light emitting device 1 according to a second modification. FIG. 8B is a schematic perspective view of the light emitting device 1 according to the second modification. The light emitting region 7 in the second modification does not emit light from the second light source 6 to the outside of the vehicle C in a region where the light emitting region 7 overlaps with the image I1 at a rear side of the image I1 in the vehicle C when viewed from the rear of the vehicle C. In this case, the light from the second light source 6 is not emitted to the outside of the vehicle C in a region where the light emitting region 7 overlaps with the image I1 at a rear side (right side of FIG. 8A) of the light emitting region 7 when the light emitting device 1 is viewed from the rear of the vehicle C. This enables to obtain the same effect as that of the first modification.

Figure 9B:
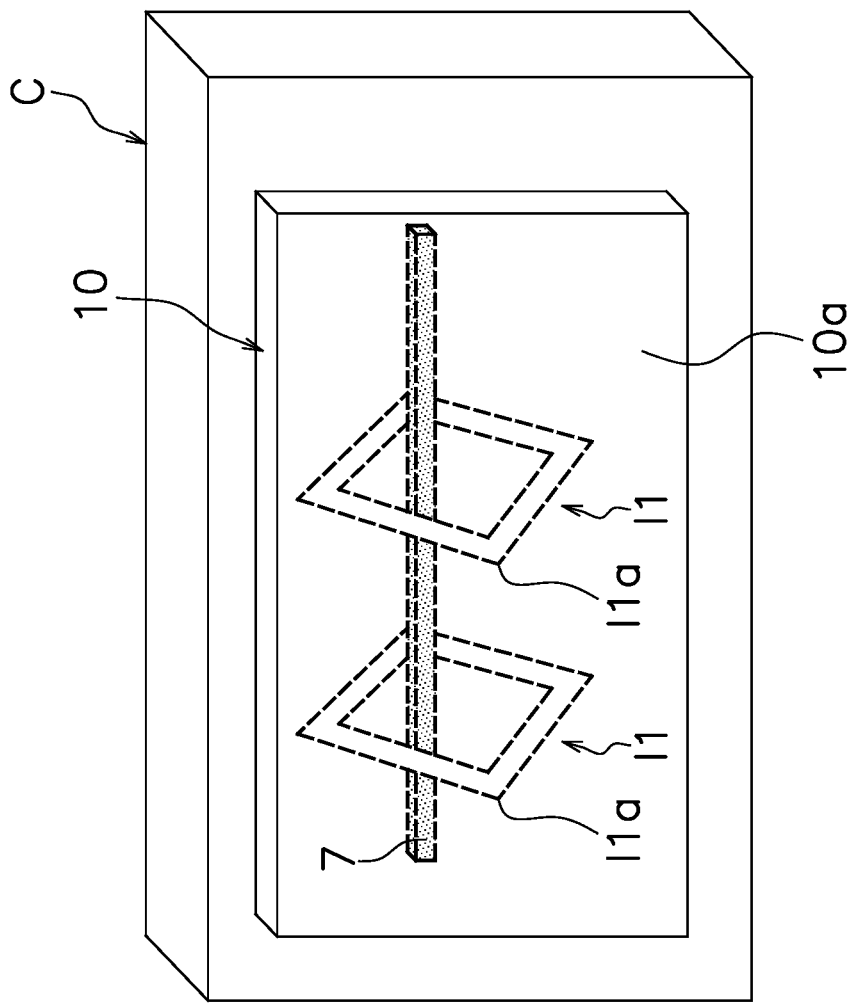
FIGS. 9A and 9B are views schematically illustrating a side view and a perspective view of the light emitting device according to a third modification.
Figure 9A:
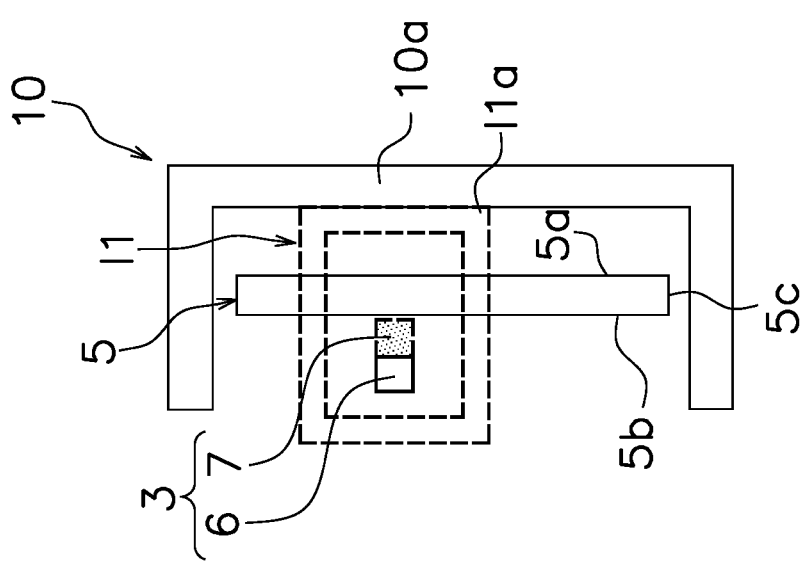

FIG. 9A is a schematic side view of the light emitting device 1 according to a third modification. FIG. 9B is a schematic perspective view of the light emitting device 1 according to the third modification. The light emitting device 1 according to the third modification is translucent and further includes a cover 10 that covers the light emitting region 7 from the outside of the vehicle C. The light emitting surface 5a of the light guide plate 5 is covered with the cover 10. A rear end I1a of the image I1 is positioned on a rear surface 10a of the cover 10. Specifically, the image I1 projects forward from the light guide plate 5 and projects from the light guide plate 5 to the rear surface 10a of the cover 10. In this case, the rear surface 10a of the cover 10 serves as a reference surface with respect to the image I1, thereby increasing a sense of depth of the image I1 and improving a three-dimensional effect of the image I1.

Figure 10B:
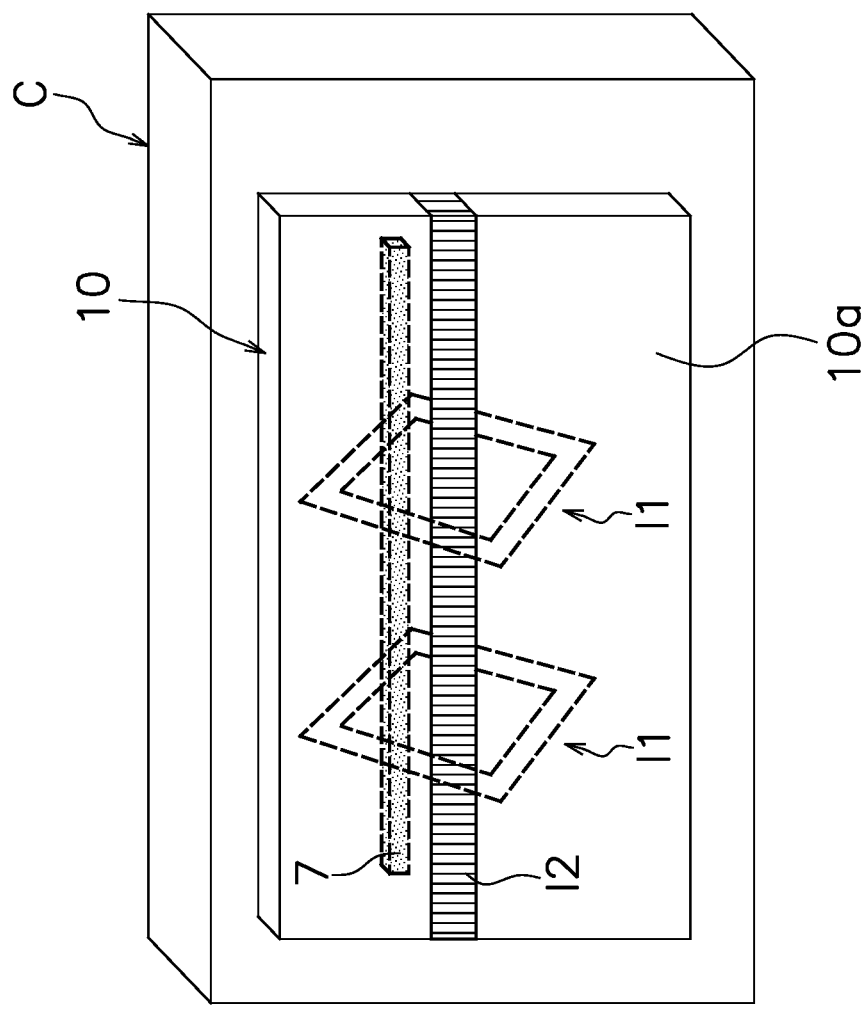
FIGS. 10A and 10B are views schematically illustrating a side view and a perspective view of the light emitting device according to a fourth modification.
Figure 10A:
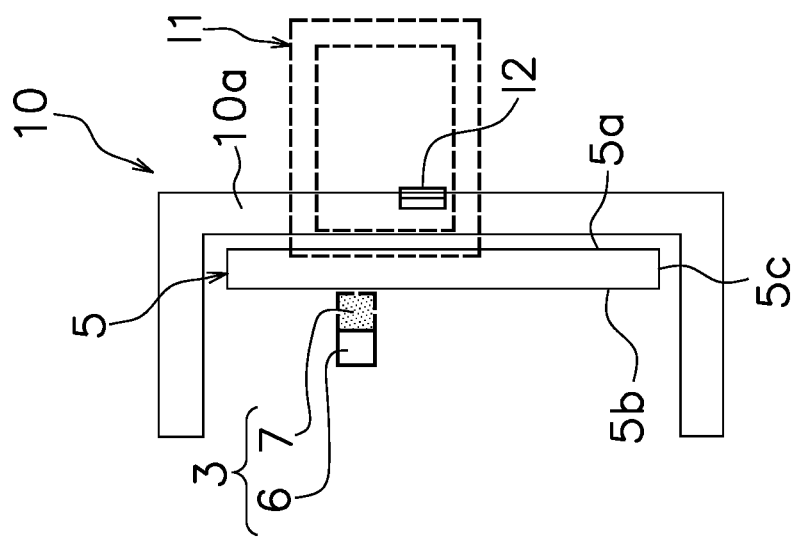

FIG. 10A is a schematic side view of the light emitting device 1 according to a fourth modification. FIG. 10B is a schematic perspective view of the light emitting device 1 according to the fourth modification. The light emitting device 1 according to the fourth modification is translucent and further includes the cover 10 that covers the light emitting region 7 from the outside of the vehicle C in the same manner as the third modification. The cover 10 according to the fourth modification includes a second image I2 displayed at a position that overlaps with the image I1 in the vehicle front-rear direction. The image I1 in the fourth modification projects beyond the rear surface 10a of the cover 10. The second image I2 extends in the vehicle width direction when viewed from the rear of the vehicle. The second image I2 is an image that is visible from the outside. A portion of the cover 10 on which the second image I2 is displayed does not have to be translucent. The second image I2 may be printed on the cover 10. A seal on which the second image I2 is printed may be attached to the cover 10. Alternatively, the second image I2 may be formed directly on the cover 10. In this case, the light emitting region 7 and the second image I2 serve as reference surfaces with respect to the image I1, thereby increasing a sense of depth of the image I1 and improving a three-dimensional effect of the image I1.

Figure 11B:
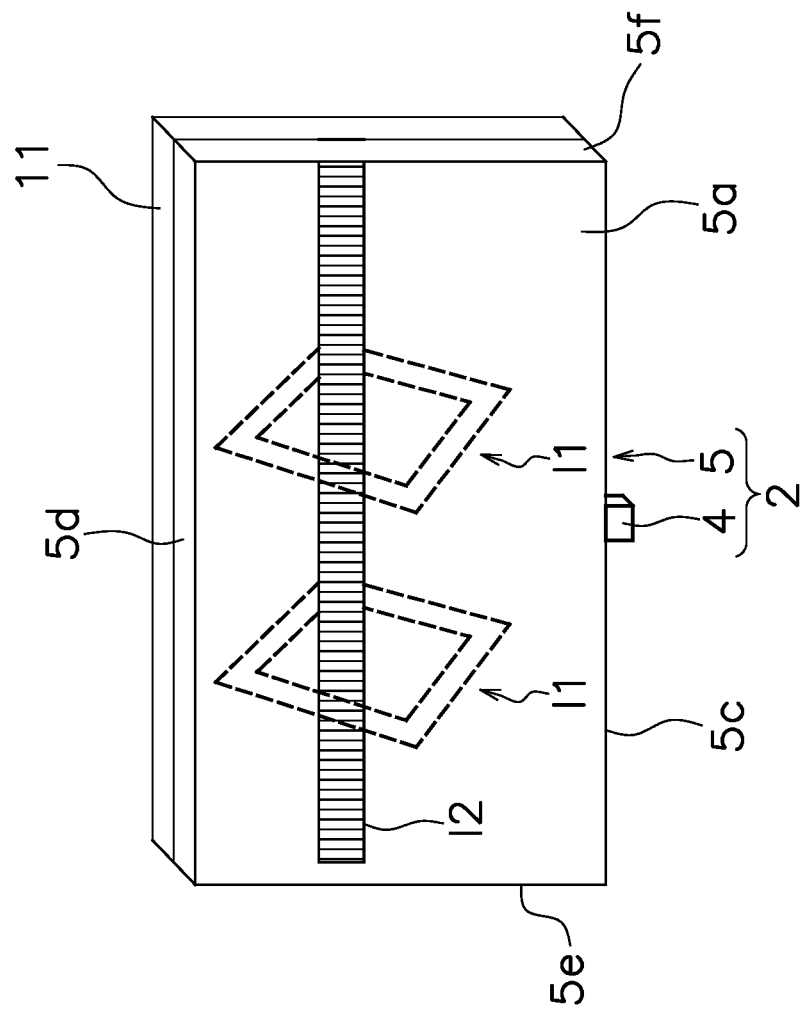
FIGS. 11A and 11B are views schematically illustrating a side view and a perspective view of the light emitting device according to a fifth modification.
Figure 11A:
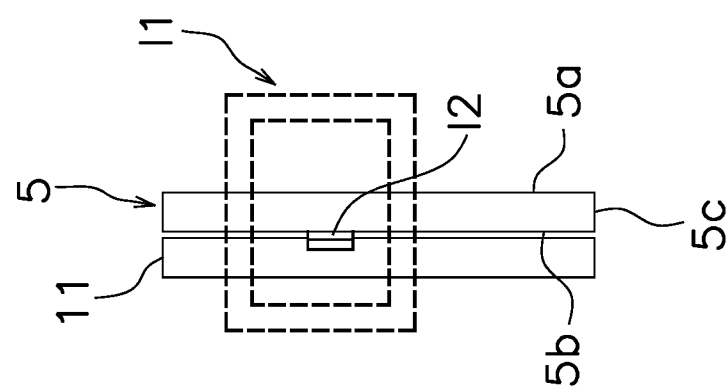

FIG. 11A is a schematic side view of the light emitting device 1 according to a fifth modification. FIG. 11B is a schematic perspective view of the light emitting device 1 according to the fifth modification. In the fifth modification, the second image I2 is provided at, for example, a housing 11 that houses the light guide plate 5. The other configurations are the same as those in the above embodiment. The light emitting region 7 is not illustrated in FIGS. 11A and 11B.

REFERENCE NUMERALS

1 Light emitting device
2 Display portion
3 Light emitting portion
4 First light source
5 Light guide plate
5a Light emitting surface
5g Curved portion
5i Test pattern portion
6 Second light source
7 Light emitting region
10 Cover
10a Rear surface
C Vehicle
I1 Image (an example of the first image)
I1a Rear end
I2 Image (an example of the second image)

The invention claimed is:
1. A light emitting device provided to a rear of a vehicle, the light emitting device comprising:
   a display portion including a first light source and a light guide plate, wherein the light guide plate comprises light guiding portions configured to guide light from the first light source to form a first image in a space; and a light emitting portion including a second light source and a light emitting region disposed behind the light guide plate and the first image in the rear view of the vehicle, the light emitting region overlapping with the first image in a rear view of the vehicle, the light emitting region facing the rear of the vehicle, the light emitting region being configured to emit light from the second light source toward the rear of the vehicle, wherein the light emitting region includes a first crossing part disposed further rearward of the vehicle than the first image, the first crossing part crossing the first image in the rear view of the vehicle, the light guide plate is further configured so as not to form the first image in a region overlapping with the first crossing part of the light emitting region in the rear view of the vehicle, and the light emitting region serves as a reference surface with respect to the first image.

2. The light emitting device according to claim 1 further comprising:
a cover that is translucent, the cover configured to cover the light emitting region from the outside of the vehicle, wherein
a rear end of the first image is positioned on a rear surface of the cover.

3. The light emitting device according to claim 1, further comprising:
a cover that is translucent, the cover configured to cover the light emitting region from the outside of the vehicle, wherein
the cover includes a second image displayed at a position that overlaps with the first image in the rear view of the vehicle.

4. The light emitting device according to claim 1, wherein the light guide plate includes a curved portion, and
a radial dimension of the curved portion is 180 mm or more.

5. The light emitting device according to claim 1, wherein the light guide plate has a light emitting surface configured to emit the light from the first light source, and
a test pattern portion configured to evaluate an emission characteristic of the light guide plate is provided on a part of the light emitting surface.

6. The light emitting device according to claim 1, wherein the first image includes a second crossing part disposed further rearward of the vehicle than the light emitting region, the second crossing part crossing the light emitting region in the rear view of the vehicle, and
the light emitting region is further configured so as not to emit the light from the second light source toward the rear of the vehicle in a region overlapping with the second crossing part of the first image in the rear view of the vehicle.

7. The light emitting device according to claim 1, wherein the light emitting region is disposed further rearward of the vehicle than a front edge of the first image and is disposed further forward than a rear edge of the first image.

8. A light emitting device provided to a rear of a vehicle, the light emitting device comprising:
a display portion including a first light source and a light guide plate, wherein the light guide plate comprises light guiding portions configured to guide light from the first light source to form a first image in a space; and
a light emitting portion including a second light source and a light emitting region disposed behind the light guide plate and the first image in the rear view of the vehicle, the light emitting region overlapping with the first image in a rear view of the vehicle, the light emitting region facing the rear of the vehicle, the light emitting region being configured to emit light from the second light source toward the rear of the vehicle, wherein
the first image includes a crossing part disposed further rearward of the vehicle than the light emitting region, the crossing part crossing the light emitting region in the rear view of the vehicle,
the light emitting region is further configured so as not to emit the light from the second light source toward the rear of the vehicle in a region overlapping with the crossing part of the first image in the rear view of the vehicle, and
the light emitting region serves as a reference surface with respect to the first image.

9. The light emitting device according to claim 8 further comprising:
a cover that is translucent, the cover configured to cover the light emitting region from the outside of the vehicle, wherein
a rear end of the first image is positioned on a rear surface of the cover.

10. The light emitting device according to claim 8, further comprising:
a cover that is translucent, the cover configured to cover the light emitting region from the outside of the vehicle, wherein
the cover includes a second image displayed at a position that overlaps with the first image in the rear view of the vehicle.

11. The light emitting device according to claim 8, wherein
the light guide plate includes a curved portion, and
a radial dimension of the curved portion is 180 mm or more.

12. The light emitting device according to claim 8, wherein
the light guide plate has a light emitting surface configured to emit the light from the first light source, and
a test pattern portion configured to evaluate an emission characteristic of the light guide plate is provided on a part of the light emitting surface.

* * * * *